US007664762B2

(12) United States Patent
Orlowska et al.

(10) Patent No.: US 7,664,762 B2
(45) Date of Patent: Feb. 16, 2010

(54) SEMANTICALLY AWARE RELATIONAL DATABASE MANAGEMENT SYSTEM AND RELATED METHODS

(75) Inventors: Maria E. Orlowska, Brookfield (AU); Wasim Sadiq, Pullenvale (AU); Shazia Sadiq, Pullenvale (AU)

(73) Assignee: SAP AG, Walldorf (DE)

( * ) Notice: Subject to any disclaimer, the term of this patent is extended or adjusted under 35 U.S.C. 154(b) by 346 days.

(21) Appl. No.: 11/668,766

(22) Filed: Jan. 30, 2007

(65) Prior Publication Data

US 2008/0183661 A1    Jul. 31, 2008

(51) Int. Cl.
*G06F 7/00* (2006.01)
(52) U.S. Cl. ..................................... 707/100; 707/102
(58) Field of Classification Search ......... 707/100–102, 707/104.1
See application file for complete search history.

(56) References Cited

U.S. PATENT DOCUMENTS

| 5,751,829 | A  | * | 5/1998  | Ringland et al. ............ 382/100 |
| 6,633,869 | B1 |   | 10/2003 | Duparcmeur et al. .......... 707/6 |
| 6,986,104 | B2 |   | 1/2006  | Green et al. ................. 715/234 |
| 7,089,306 | B2 |   | 8/2006  | Thorpe et al. ................ 709/224 |
| 7,124,142 | B2 |   | 10/2006 | McBride et al. ............. 707/101 |
| 2002/0062241 | A1 | * | 5/2002  | Rubio et al. .................. 705/10 |
| 2005/0060342 | A1 | * | 3/2005  | Farag .......................... 707/102 |
| 2006/0218123 | A1 | * | 9/2006  | Chowdhuri et al. ............ 707/2 |
| 2007/0055948 | A1 | * | 3/2007  | Cui .............................. 715/863 |
| 2008/0154873 | A1 | * | 6/2008  | Redlich et al. .................. 707/5 |

OTHER PUBLICATIONS

'Flexible string matching against large databases in practice' [online]. Koudas et al., 2004 [retrieved on Jan. 29, 2007]. Retrieved from the Internet: <URL: www.vldb.org/conf/2004/IND3P3.PDF>, 9 pages.

* cited by examiner

*Primary Examiner*—Wilson Lee
(74) *Attorney, Agent, or Firm*—Fish & Richardson P.C.

(57) ABSTRACT

A semantically aware relational database management system includes suitable programming to relate attributes of the relational database to semantic equivalents of such attributes. In response to receiving a query, the relational database management system performs at least one semantically aware operation on the data in the relational database in order to determine what data is to be retrieved in response to the query. Results of the query presented to a user may include data derived from performing the semantically aware operations.

15 Claims, 4 Drawing Sheets

US 7,664,762 B2

SEMANTICALLY AWARE RELATIONAL DATABASE MANAGEMENT SYSTEM AND RELATED METHODS

TECHNICAL FIELD

This disclosure relates to relational database management systems.

BACKGROUND

Relational database management systems (RDBMS) may be designed to permit multiple users to search, access, or otherwise process databases of information, often by using SQL-based application programs and queries. Databases and information accessible by such systems sometimes derive from multiple sources or may even be in distributed, multiple-database systems, database federation systems, or other versions of data integrated constructions, including data warehousing, and, more recently, e-business applications.

Data integration is one aspect of RDBMS systems which may facilitate the processing of information contained in such databases. One of the issues associated with data integration is data mismatch, which may arise for any number of reasons. One example of data mismatch is caused by the fact that, in the real world, different terms associated with data may have the same or similar semantic meaning or interpretation.

SUMMARY

According to one aspect, a computer-implemented method involves relating attributes of a relational database to semantic equivalents of the attributes. A query to retrieve data from the relational database can be received. The determination of what data to retrieve is based on performing one or more semantically aware operations on the data in a relational database. The operation(s) performed may include semantic select, semantic project, semantic join, semantic union, and semantic intersection.

In one method, relating the attributes to the semantic equivalents involves generating tables associating different terms with corresponding attributes, including one table which includes master names corresponding to one of the terms.

In another method, a database query is able to be received and, in response to the query not specifically requesting semantically enhanced results, the query in the given form is processed without semantically aware operations. In response to the query making such a request, the query is processed using the semantically aware operations.

In one system implementation, a relational database management system includes a relational database configured to be user-accessible and user-searchable via SQL queries. The database includes attributes having associated terms and classes. A database extension is provided which includes category tables and master tables (for each attribute which will be designed for semantic enhancement). The category tables include different terms associated with the attributes, whereas the master table includes master names corresponding to one of the terms associated with the attributes. The system includes a graphical user interface to receive user input, including the SQL queries related to data in the database. A query processing engine is adapted to perform semantically aware operations on the data associated with the queries.

One option is to configure the database extension and the query processing engine so as to be retrofittable to the relational database without substantial modification thereto. According to other aspects of the system, the relational database may be in the form of a centralized data structure storing the data in one logical database, or it may include data distributed at multiple sites.

The details of one or more implementations are set forth in the accompanying drawings and the description below. Other features, will be apparent from the description and drawings, and from the claims.

DESCRIPTION OF DRAWINGS

Like reference symbols in the various drawings indicate like elements.

DETAILED DESCRIPTION

Figure 1:
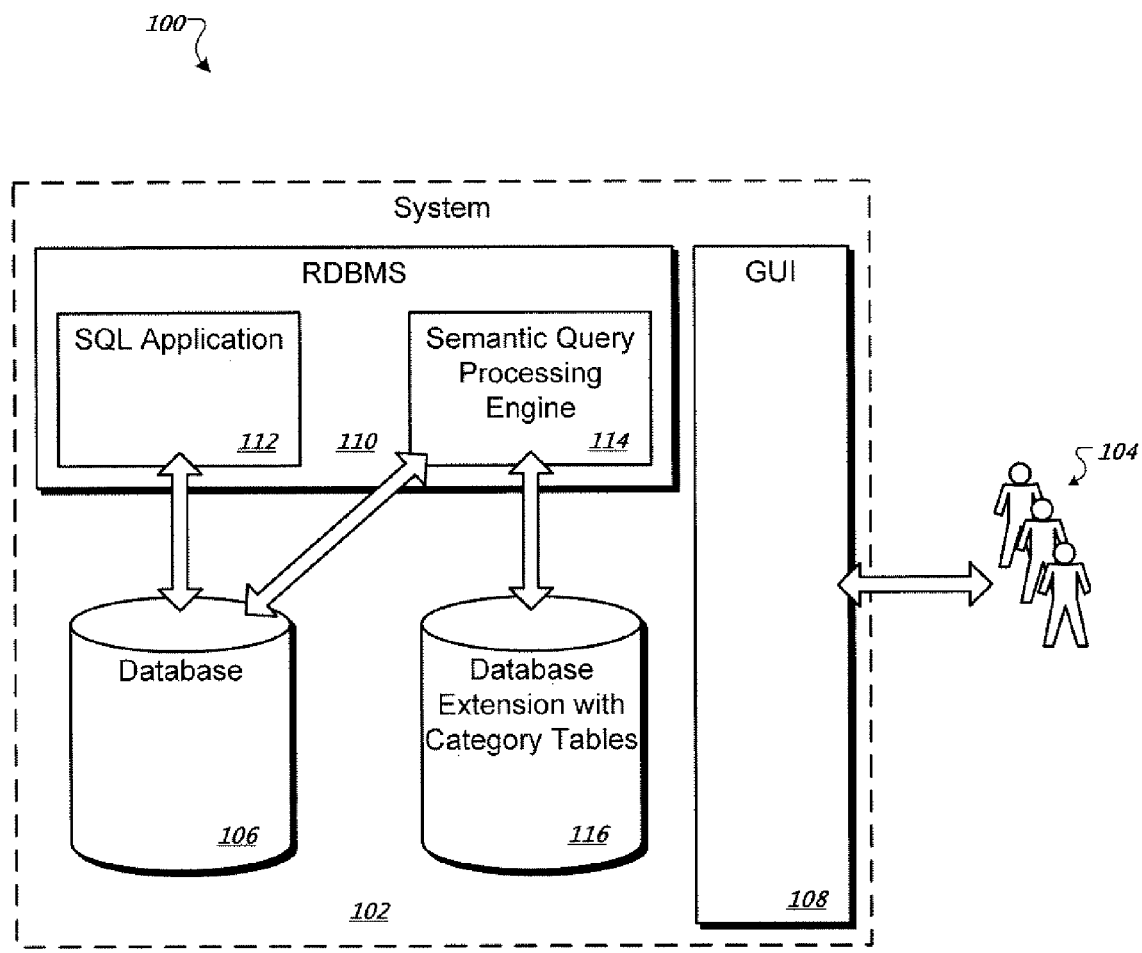
FIG. 1 is a schematic diagram showing an example of a system for performing semantically aware operations.

FIG. 1 is a schematic diagram showing an example of a system 100 for performing semantically aware operations. The system 100 includes a computer system hardware, software, or a combination of both, for determining the semantic equivalents associated with attributes of data in a relational database 106, and presenting one or more of such semantic equivalents in response to queries of the database 106. The computer system 102, in one implementation, may include one or more enterprise system applications, such as enterprise resource planning (ERP), customer relationship management (CRM), supply chain management (SCM), and the like.

A relational database management system (RDBMS) 110 manages access to the database 106. The database 106 may be a single database or distributed at multiple sites. The database 106 may include a centralized data structure that stores data in one logical database. The RDBMS 110 may use a Structured Query Language (SQL) application 112 to process a query received from a user through graphical user interface (GUI) 108. The SQL application 112 uses a semantic query processing engine 114 to determine semantic equivalents (e.g., synonyms) of terms in the query. The query may include (e.g., invoke) one or more relational algebra terms such as a select, a project, a join, a union, and/or an intersection. These operations are rendered semantically aware in that, in addition to terms included in the query, the system 102 also uses semantically equivalent synonyms of the terms when processing the query. A database extension 116 stores category tables that list semantic equivalents of the terms in the query. For example, the query may include a term, such as "Information Technology and Electrical Engineering." The engine 114 locates "Information Technology and Electrical Engineering" in the database extension 116. The database extension 116 has semantically equivalent terms associated with "Information Technology and Electrical Engineering," such as "ITEE," "IT and EE," and "IT&EE." The engine 114 and/or the SQL application 112 use the semantically equivalent terms in addition to the original term when processing (e.g., performing) the query. In certain implementations, the engine 114 and/or the database extensions 116 may be an add-on to an existing RDBMS. The engine 114 or semantic relational algebra operations may be invoked in response to user input, or based on one or more conditions being satisfied. The condition may relate to the nature or structure of the query. Absent prerequisite conditions or input, the semantically aware operations may not be invoked.

Figure 2:
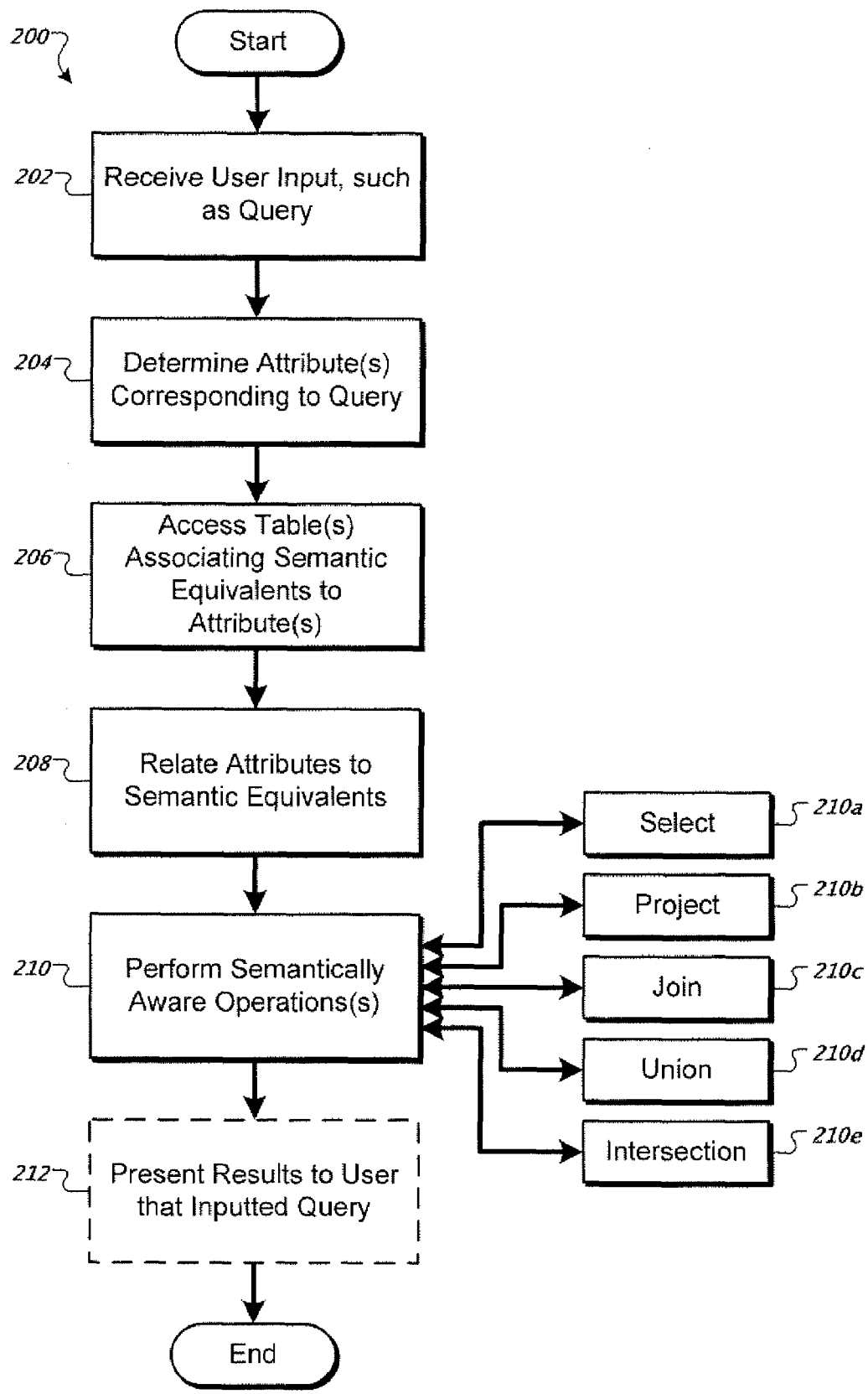
FIG. 2 is a flow chart showing one exemplary process for performing semantically aware operations.
Figure 3:
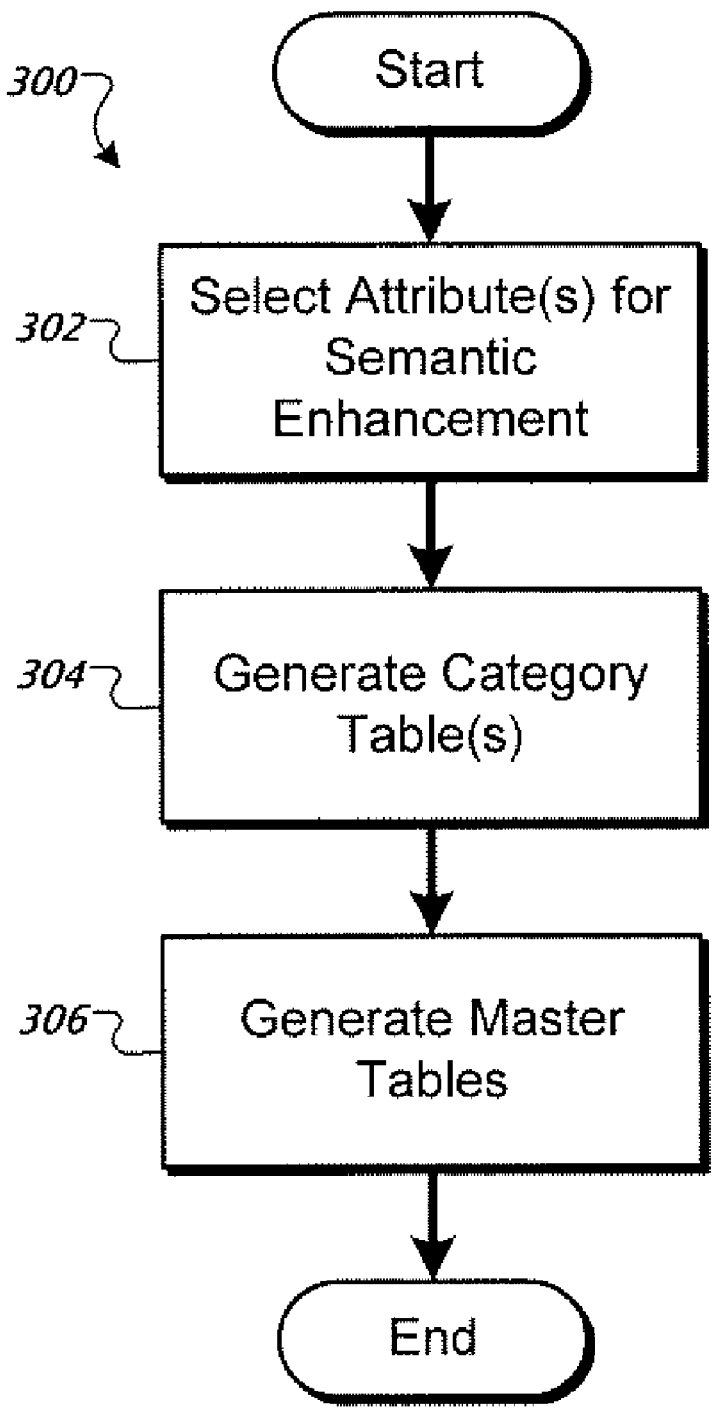
FIG. 3 is a flow chart showing one exemplary process for constructing the database extension.

FIGS. 2 and 3 are flow charts showing examples of processes 200 and 300 for performing semantically aware operations. The processes 200 and 300 may be performed, for example, by a system such as the system 100. For clarity of presentation, the description that follows uses the system 100 as the basis of an example for describing the processes 200 and 300. However, another system, or combination of systems, may be used to perform the processes 200 and 300.

FIG. 2 is a flow chart showing an example of one process 200 for performing semantically aware operations. The process 200 begins with receiving (202) a user input, such as a query on a database. For example, the user 104 may input a query on the database 106 using the GUI 108. The query may perform an operation on the following data table from the database 106:

TABLE r(A1, A2)

| A1 | A2 |
| --- | --- |
| Wide Panel 33' HD | S1 |
| Alloy Hinge 3879 | S2 |
| Wide Panel 33' HD | S3 |
| Javtray 94 | S3 |
| #3879 Alloy Hinge | S4 |
| High Density WP '33 | S5 |
| JT94 | S6 |
| Javtray 94 | S7 |

The data table r(A1, A2) includes values for the attributes A1 and A2. Each row of the table r(A1, A2) relates a value of A1 to a value of A2.

The process 200 determines (204) attributes corresponding to the query. For example, the engine 114 determines that the received query includes the attributes A1 and A2.

The process 200 accesses (206) one or more tables that associate semantic equivalents to the attributes. For example, the engine 114 accesses the database extension 116. The database extension 116 may include the following category table:

TABLE v(T, Cid)

| T | Cid |
| --- | --- |
| Wide Panel 33' HD | 1 |
| Alloy Hinge 3879 | 2 |
| Javtray 94 | 3 |
| #3879 Alloy Hinge | 2 |
| High Density WP '33 | 1 |
| JT94 | 3 |
| HDWP33 | 1 |
| AH3879 | 2 |

The category table v(T, Cid) includes values for the attributes T and Cid. T includes semantic equivalents for the possible values in A1. Cid includes class identifiers for the groups of semantic equivalents (e.g., semantic equivalents of "Wide Panel 33'HD" have a Cid of 1, semantic equivalents of "Alloy Hinge 3879" have a Cid of 2, semantic equivalents of "Javtray 94" have a Cid of 3). The database extension 116 may include the following master table:

TABLE w(T, Cid)

| T | Cid |
| --- | --- |
| Wide Panel 33' HD | 1 |
| Alloy Hinge 3879 | 2 |
| Javtray 94 | 3 |

The master table w(T, Cid) includes values for the attributes T and Cid. T includes a single master value for each class identifier. Cid includes a list of the class identifiers. In general, the category tables and the master tables may include semantic equivalents and master names for more than one attribute. The additional equivalents and master names may be stored, for example, in additional tables or in the tables shown above using an additional attribute, such as an attribute that identifies whether the semantic equivalent or master name is associated with A1 or A2.

FIG. 3 is a flow chart showing the process 300 for constructing the database extensions provided hereunder. The process 300 begins with selecting (302) one or more attributes for semantic enhancement. For example, the engine 114 may select the attributes A1 and A2.

The process 300 generate (304) one or more category tables. The category tables include lists of semantically equivalent terms to be used in queries on a database. The groups of semantically equivalent terms may be grouped into classes and the category tables may include class identifiers for each of the semantically equivalent terms. Each class identifier is used to identify a group of semantically equivalent terms. For example, an administrator user of the RDBMS 110 may input category table information using the GUI 108.

The process 300 generates (306) one or more master tables. The master tables include a single master name for each group of semantically equivalent terms. For example, the administrator user may input master table information using the GUI 108.

Referring again to FIG. 2, the process 200 relates (208) attributes in the query to their semantic equivalents. Relating the attributes to semantic equivalents includes determining the semantic equivalents by searching for values of the attribute T in the category table v that have the same Cid attribute. Relating the attributes may also include determining a master value of the T attribute by looking up the Cid value in the master table w. The process 200 performs (210) one or more semantically aware operations, such as a semantic select (210a), a semantic project (210b), a semantic join (210c), a semantic union (210d), and/or a semantic intersection (210c).

Semantic Select 210a

For example, the user 104 may input a query including (e.g., invoking) a select statement that selects A1 and A2 from the data table r(A1, A2) where A1 equals "Wide Panel 33' HD." The process 200 performs the semantic select 210a in response to the select statement in the query. The query may be represented by the following equation:

$$T1 = \sigma_{A1=\text{``WidePanel33'HD''}}(r)$$

T1 represents the results of the query. The results of the query are shown in the following table:

TABLE T1

| A1 | A2 |
| --- | --- |
| Wide Panel 33' HD | S1 |
| Wide Panel 33' HD | S3 |

Next, a simple join is performed between the results T1 and the category table v on the attribute A1 in the results T1 and the attribute T in the category table v. The operation may be represented by the following equation:

$$T2 = T1 \bowtie_{A1=T}(v)$$

T2 represents the results of the simple join. The results of the simple join are shown in the following table:

TABLE T2

| A1 | A2 | T | Cid |
|---|---|---|---|
| Wide Panel 33' HD | S1 | Wide Panel 33' HD | 1 |
| Wide Panel 33' HD | S3 | Wide Panel 33' HD | 1 |

Next, a simple join is performed between the results T2 and the category table v on the attribute Cid in the results T2 and the attribute Cid in the category table v. The results of the simple join operation are shown in the following table:

Table showing results of simple join between T2 and v

| A1 | A2 | T2.T | T2.Cid | T | Cid |
|---|---|---|---|---|---|
| Wide Panel 33' HD | S1 | Wide Panel 33' HD | 1 | Wide Panel 33' HD | 1 |
| Wide Panel 33' HD | S3 | Wide Panel 33' HD | 1 | Wide Panel 33' HD | 1 |
| Wide Panel 33' HD | S1 | Wide Panel 33' HD | 1 | High Density WP '33 | 1 |
| Wide Panel 33' HD | S3 | Wide Panel 33' HD | 1 | High Density WP '33 | 1 |

A project operation is performed on the results of the simple join with respect to the attribute T. The operation may be represented by the following equation:

$$T3 = \pi_T(T2 \bowtie_{T2.Cid=v.Cid}(v))$$

T3 represents the results of the project and simple join operations. The following table shows the results of the project and the simple join:

TABLE T3

| T |
|---|
| Wide Panel 33' HD |
| High Density WP '33 |

Next, a simple join is performed between the results T3 and the data table r on the attribute T in the results T3 and the attribute A1 in the data table r. The results of the simple join operation are shown in the following table:

Table showing results of simple join between T3 and r

| T | $A_1$ | $A_2$ |
|---|---|---|
| Wide Panel 33' HD | Wide Panel 33' HD | S1 |
| Wide Panel 33' HD | Wide Panel 33' HD | S3 |
| High Density WP '33 | High Density WP '33 | S5 |

A project operation is performed on the results of the simple join with respect to the attributes A1 and A2. The operation may be represented by the following equation:

$$T4 = \alpha_{A1,A2}(T3 \bowtie_{T=A1}(r))$$

T4 represents the results of the project and simple join operations. The following table shows the results of the project and the simple join:

TABLE T4

| $A_1$ | $A_2$ |
|---|---|
| Wide Panel 33' HD | S1 |
| Wide Panel 33' HD | S3 |
| High Density WP '33 | S5 |

The results T4 are the results of performing the semantic select 210*a*. The results T4 include the results T1 of the query as input by the user 104 as well as the result "High Density WP '33" obtained from semantic equivalents of the term "Wide Panel 33' HD." In general, the semantic select 210*a* on the attribute A1 having a value of "a" in the data table r with category table v may be represented by the following equation:

$$\pi_{A1,A2}((\pi_T(((\sigma_{A1="a"}(r)) \bowtie_{A1=T}(v)) \bowtie_{Cid}(v))) \bowtie_{T=A1}(r))$$

Semantic Project 210*b*

In another example, the user 104 may input a query that performs (e.g., invokes) a project operation on the data table r with respect to the attribute A1. The process 200 performs the semantic project 210*b* in response to the project operation in the query. The query may be represented with the following equation:

$$T5 = \pi_{A1}(r)$$

The results T5 of the project operation are shown in the following table:

TABLE T5

| A1 |
|---|
| Wide Panel 33' HD |
| Alloy Hinge 3879 |
| Javtray 94 |
| #3879 Alloy Hinge |
| High Density WP '33 |
| JT94 |

Next, a simple join is performed between the results T5 and the category table v on the attribute A1 in the results T5 and the attribute T in the category table v. The simple join may be represented by the following equation:

$$T6 = T5 \bowtie_{A1=T}(v)$$

The results T6 of the simple join are shown in the following table:

TABLE T6

| A1 | T | Cid |
|---|---|---|
| Wide Panel 33' HD | Wide Panel 33' HD | 1 |
| Alloy Hinge 3879 | Alloy Hinge 3879 | 2 |
| Javtray 94 | Javtray 94 | 3 |
| #3879 Alloy Hinge | #3879 Alloy Hinge | 2 |
| High Density WP '33 | High Density WP '33 | 1 |
| JT94 | JT94 | 3 |

Next, a simple join is performed between the results T6 and the master table w on the attribute Cid in the results T6 and the attribute Cid in the master table w. The simple join may be represented by the following equation:

$$T7 = T6 \bowtie_{T6.Cid = w.Cid}(w)$$

The results T7 are shown in the following table:

TABLE T7

| A1 | T7.T | T7.Cid | T | Cid |
|---|---|---|---|---|
| Wide Panel 33' HD | Wide Panel 33' HD | 1 | Wide Panel 33' HD | 1 |
| Alloy Hinge 3879 | Alloy Hinge 3879 | 2 | Alloy Hinge 3879 | 2 |
| Javtray 94 | Javtray 94 | 3 | Javtray 94 | 3 |
| #3879 Alloy Hinge | #3879 Alloy Hinge | 2 | Alloy Hinge 3879 | 2 |
| High Density WP '33 | High Density WP '33 | 1 | Wide Panel 33' HD | 1 |
| JT94 | JT94 | 3 | Javtray 94 | 3 |

Next, a project is performed on the results T7 with respect to the attribute T. The project operation may be represented by the following equation:

$$T8 = \pi_T(T7)$$

The results T8 are shown in the following table:

TABLE T8

| T |
|---|
| Wide Panel 33' HD |
| Alloy Hinge 3879 |
| Javtray 94 |

The results T8 remove not only literal duplicates as in the project operation as input by the user and shown in the results T6, but also semantically equivalent duplicates. In general, the semantic project 210b on the attribute A1 may be represented by the following equation:

$$\pi_T(((\pi_{A1}(r)) \bowtie_{A1=T}(v)) \bowtie_{Cid}(w))$$

Semantic Join 210c

In another example, the user 104 may input a query that performs (e.g., invokes) a join operation between the data table r and a data table p with respect to the attribute A1 and an attribute A3 in the data table p. The process 200 performs the semantic join 210c in response to the join operation in the query. The data table p is shown in the following table:

TABLE p(A3, A4)

| $A_3$ | $A_4$ |
|---|---|
| AH3879 | S1 |
| HDWP33 | S2 |
| JT94 | S3 |

The query may be represented with the following equation:

$$T9 = r \bowtie_{A1=A3}(p)$$

The results T9 of the join are shown in the following table:

TABLE T9

| $A_1$ | $A_2$ | $A_3$ | $A_4$ |
|---|---|---|---|
| JT94 | S6 | JT94 | S3 |

The semantic join begins with performing a simple join between the data table r and the category table v. The simple join may be represented by the following equation:

The results T10 of the $$T10 = r \bowtie_{A1=T} 10(v)$$

simple join are shown in the following table:

TABLE T10

| $A_1$ | $A_2$ | T | Cid |
|---|---|---|---|
| Wide Panel 33' HD | S1 | Wide Panel 33' HD | 1 |
| Alloy Hinge 3879 | S2 | Alloy Hinge 3879 | 2 |
| Wide Panel 33' HD | S3 | Wide Panel 33' HD | 1 |
| Javtray 94 | S3 | Javtray 94 | 3 |
| #3879 Alloy Hinge | S4 | #3879 Alloy Hinge | 2 |
| High Density WP '33 | S5 | High Density WP '33 | 1 |
| JT94 | S6 | JT94 | 3 |
| Javtray 94 | S7 | Javtray 94 | 3 |

Next, a simple join is performed between the results T10 and the master table w. The results of the simple join are shown in the following table:

| Table showing results of simple join between T10 and the master table w | | | | |
|---|---|---|---|---|
| A1 | A2 T10.T | | T10.Cid T | Cid |
| Wide Panel 33' HD | S1 | Wide Panel 33' HD | 1 Wide Panel 33' HD | 1 |
| Alloy Hinge 3879 | S2 | Alloy Hinge 3879 | 2 Alloy Hinge 3879 | 2 |
| Wide Panel 33' HD | S3 | Wide Panel 33' HD | 1 Wide Panel 33' HD | 1 |
| Javtray 94 | S3 | Javtray 94 | 3 Javtray 94 | 3 |

-continued

Table showing results of simple join between T10 and the master table w

| A1 | A2 | T10.T | T10.Cid | T | Cid |
|---|---|---|---|---|---|
| #3879 Alloy Hinge | S4 | #3879 Alloy Hinge | 2 | Alloy Hinge 3879 | 2 |
| High Density WP '33 | S5 | High Density WP '33 | 1 | Wide Panel 33' HD | 1 |
| JT94 | S6 | JT94 | 3 | Javtray 94 | 3 |
| Javtray 94 | S7 | Javtray 94 | 3 | Javtray 94 | 3 |

Then a project operation is performed with respect to the attributes A1, A2, and Cid. The simple join and project operations may be represented by the following equation:

$$T11 = \pi_{A1,A2,Cid}(T10 \bowtie_{T10.Cid=w.Cid}(w))$$

The results T11 are shown in the following table:

TABLE T11

| A1 | A2 | Cid |
|---|---|---|
| Wide Panel 33' HD | S1 | 1 |
| Alloy Hinge 3879 | S2 | 2 |
| Wide Panel 33' HD | S3 | 1 |
| Javtray 94 | S3 | 3 |
| #3879 Alloy Hinge | S4 | 2 |
| High Density WP '33 | S5 | 1 |
| JT94 | S6 | 3 |
| Javtray 94 | S7 | 3 |

Next, a simple join is performed between the data table p and the category table v. The results are joined with the master table w and a project operation is performed with respect to the attributes A3, A4, and Cid. The operations may be represented by the following equation:

$$T12 = \pi_{A3,A4,Cid}((p \bowtie_{A3=T}(v)) \bowtie_{Cid}(w))$$

The results of the two simple joins are shown in the following table:

Table showing results of two simple joins between p, v, and w

| A3 | A4 | (p ⋈ v).T | (p ⋈ v).Cid | T | Cid |
|---|---|---|---|---|---|
| AH3879 | S1 | AH3879 | 2 | Alloy Hinge 3879 | 2 |
| HDWP33 | S2 | HDWP33 | 1 | Wide Panel 33' HD | 1 |
| JT94 | S3 | JT94 | 3 | Javtray 94 | 3 |

The results T12 are shown in the following table:

TABLE T12

| A3 | A4 | Cid |
|---|---|---|
| AH3879 | S1 | 2 |
| HDWP33 | S2 | 1 |
| JT94 | S3 | 3 |

Next, a simple join is performed between the results T11 and the results T12 on the attributes Cid in the results T11 and T12. The simple join may be represented by the following equation:

$$T13 = T11 \bowtie_{T11.Cid=T12.Cid}(T12)$$

The results T13 are shown in the following table:

TABLE T13

| A1 | A2 | T11.Cid | A3 | A4 | T12.Cid |
|---|---|---|---|---|---|
| Wide Panel 33' HD | S1 | 1 | HDWP33 | S2 | 1 |
| Alloy Hinge 3879 | S2 | 2 | AH3879 | S1 | 2 |
| Wide Panel 33' HD | S3 | 1 | HDWP33 | S2 | 1 |
| Javtray 94 | S3 | 3 | JT94 | S3 | 3 |
| #3879 Alloy Hinge | S4 | 2 | AH3879 | S1 | 2 |
| High Density WP '33 | S5 | 1 | HDWP33 | S2 | 1 |
| JT94 | S6 | 3 | JT94 | S3 | 3 |
| Javtray 94 | S7 | 3 | JT94 | S3 | 3 |

Next, a project operation is performed on the results T13. The project operation may be represented by the following equation:

$$T14 = \pi_{A1,A2,A3,A4}(T13)$$

The results T14 of the project operation are shown in the following table:

TABLE T14

| A1 | A2 | A3 | A4 |
|---|---|---|---|
| Wide Panel 33' HD | S1 | HDWP33 | S2 |
| Alloy Hinge 3879 | S2 | AH3879 | S1 |
| Wide Panel 33' HD | S3 | HDWP33 | S2 |
| Javtray 94 | S3 | JT94 | S3 |
| #3879 Alloy Hinge | S4 | AH3879 | S1 |
| High Density WP '33 | S5 | HDWP33 | S2 |
| JT94 | S6 | JT94 | S3 |
| Javtray 94 | S7 | JT94 | S3 |

The semantic join results T14 include the literal equivalent terms from the data tables r and p shown in the results T9 as well as the semantic equivalents of the terms in the data tables r and p. In general, the semantic join 210c between the data tables r and p may be represented by the following equations:

$$T11 = \pi_{A1,A2,Cid}((r \bowtie_{A1=T}(v)) \bowtie_{Cid}(w))$$

$$T12 = \pi_{A3,A4,Cid}((p \bowtie_{A3=T}(v)) \bowtie_{Cid}(w))$$

$$\pi_{A1,A2,A3,A4}(T11 \bowtie_{Cid}(T12))$$

Semantic Union 210d

Semantic union and semantic intersection operations may be performed using the results T11 and T12. The process 200 may perform the semantic union 210d in response to a union operation in a query. The semantic union 210d may be represented by the following equation:

$$T15 = \pi_{A1,A2,A3,A4}(T11 \cup_{Cid} (T12))$$

The results T15 are shown in the following table:

TABLE T15

| A1 | A2 | A3 | A4 |
|---|---|---|---|
| Wide Panel 33' HD | S1 | | |
| Alloy Hinge 3879 | S2 | | |
| Wide Panel 33' HD | S3 | | |
| Javtray 94 | S3 | JT94 | S3 |
| #3879 Alloy Hinge | S4 | | |
| High Density WP '33 | S5 | | |
| JT94 | S6 | | |
| Javtray 94 | S7 | | |
| | | AH3879 | S1 |
| | | HDWP33 | S2 |

Semantic Intersection 210e

The process 200 may perform the semantic intersection 210e in response to an intersection operation in a query. The semantic intersection 210e may be represented by the following equation:

$$T16 = \pi_{A1,A2,A3,A4}(T11 \cap_{Cid}(T12))$$

The results T16 are shown in the following table:

TABLE T16

| A1 | A2 | A3 | A4 |
|---|---|---|---|
| Javtray 94 | S3 | JT94 | S3 |

The process 200 optionally presents (212) results to a user that inputted a query. For example, the RDBMS 110 may present query results to the user 104 within the GUI 108. In certain implementations, the GUI 108 is one or more of an enterprise system such as enterprise resource planning application, a customer relationship management application, or a supply chain management application.

Figure 4:
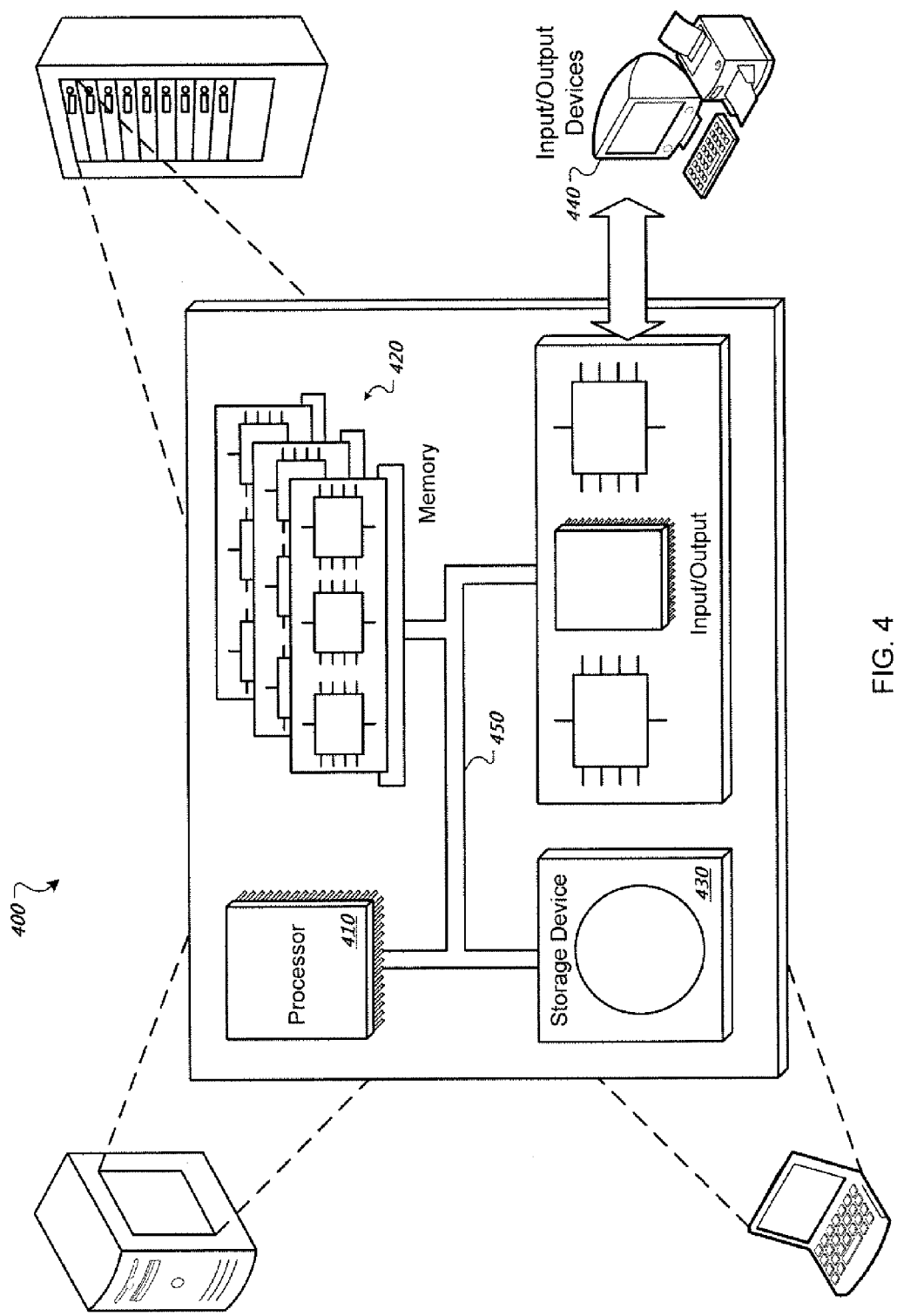
FIG. 4 is a schematic diagram showing an example of one computer system suitable for performing operations discussed herein.

FIG. 4 is a schematic diagram showing an example of one suitable computer system 400, which can be associated with the above described processes. The system 400 can be used for the operations described in association with the processes 200 and 300 according to one implementation. For example, the system 400 may include, or be included in, the system 102.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Nevertheless, it will be understood that various modifications may be made without departing from the spirit and scope of the following claims. Accordingly, other implementations are within the scope of the following claims.

What is claimed is:

1. A computer system comprising:
   a relational database stored in computer-readable memory and configured to be user-accessible and user-searchable via SQL-based queries, the database including attributes having associated terms and classes;
   a database extension stored in computer-readable memory and including category tables and a master table, the category tables including different terms associated with the attributes, the master table including master names corresponding to one of the terms associated with the attributes; and
   a processor adapted to generate:
      a graphical user interface to receive user input, including the SQL-based queries related to data in the database; and
      a query processing engine adapted to determine semantic equivalents of terms in the queries, and to perform semantically aware operations on the terms and semantic equivalents associated with the queries received through the graphical user interlace.

2. The system of claim 1, wherein the database extension and the query processing engine are configured to be retrofittable to the relational database without substantial modification thereto.

3. The system of claim 1, wherein the relational database comprises a centralized data structure storing the data in one logical database, and wherein the graphical user interface enables multiple users to query the data structure.

4. The system of claim 1, wherein the relational database includes data distributed at multiple sites.

5. A computer-implemented method comprising:
   accessing a relational database stored in computer-readable memory and configured to be user-accessible and user-searchable via SQL-based queries, the database including attributes having associated terms and classes;
   accessing a database extension stored in computer-readable memory and including category tables and a master table, the category tables including different terms associated with the attributes, the master table including master names corresponding to one of the terms associated with the attributes;
   using a graphical user interface generated by a processor to receive user input, including the SQL-based queries related to data in the database; and
   using a query processing engine generated by a processor to determine semantic equivalents of terms in the queries, and to perform semantically aware operations on the terms and semantic equivalents associated with the queries received through the graphical user interface.

6. The method of claim 5, wherein the database extension and the query processing engine are configured to be retrofittable to the relational database without substantial modification thereto.

7. The method of claim 5, wherein the relational database comprises a centralized data structure storing the data in one logical database, and wherein the graphical user interface enables multiple users to query the data structure.

8. The method of claim 5, wherein the relational database includes data distributed at multiple sites.

9. A computer storage medium encoded with a computer program, the program comprising instructions that when executed by data processing apparatus cause the data processing apparatus to perform operations comprising:
   accessing a relational database configured to be user-accessible and user-searchable via SQL-based queries, the database including attributes having associated terms and classes;
   accessing a database extension including category tables and a master table, the category tables including different terms associated with the attributes, the master table including master names corresponding to one of the terms associated with the attributes;
   using a graphical user interface to receive user input, including the SQL-based queries related to data in the database; and
   using a query processing engine to determine semantic equivalents of terms in the queries, and to perform semantically aware operations on the terms and semantic equivalents associated with the queries received through the graphical user interface.

10. The computer storage medium of claim 9, wherein the database extension and the query processing engine are configured to be retrofittable to the relational database without substantial modification thereto.

11. The computer storage medium of claim 9, wherein the relational database comprises a centralized data structure storing the data in one logical database, and wherein the graphical user interface enables multiple users to query the data structure.

12. The computer storage medium of claim 9, wherein the relational database includes data distributed at multiple sites.

13. The system of claim 1, wherein the category tables list the semantic equivalents.

14. The method of claim 5, wherein the category tables list the semantic equivalents.

15. The computer storage medium of claim 9, wherein the category tables list the semantic equivalents.

* * * * *